United States Patent [19]

Kondo

[11] Patent Number: 4,573,833

[45] Date of Patent: Mar. 4, 1986

[54] NOZZLE DEVICE FOR CUTTING FLUID FOR MACHINE TOOLS

[75] Inventor: Koji Kondo, Fukui, Japan

[73] Assignee: Kabushiki Kaisha Matsuura Kikai Seisakusho, Japan

[21] Appl. No.: 542,213

[22] Filed: Oct. 14, 1983

[30] Foreign Application Priority Data

Dec. 13, 1982 [JP] Japan .................................. 57-217039

[51] Int. Cl.$^4$ ........................ B23B 39/08; B23B 51/06; B05B 15/08
[52] U.S. Cl. ......................................... 408/3; 239/69; 239/587; 408/61; 409/136
[58] Field of Search ........................... 408/8, 56, 3, 61; 409/135, 136, 80; 29/568; 239/69, 587

[56] References Cited

U.S. PATENT DOCUMENTS 3,793,625  2/1974  Pomella et al. ..................... 408/3 X 4,076,442  2/1978  Cox, Jr. et al. .................... 408/56 X

FOREIGN PATENT DOCUMENTS 1422532  1/1976  United Kingdom ................ 239/587

Primary Examiner—Z. R. Bilinsky
Assistant Examiner—Steven C. Bishop
Attorney, Agent, or Firm—McGlew and Tuttle

[57] ABSTRACT

The present invention relates to a jet device for cutting liquid of a machine tool comprising a rotary actuator attached at a suitable position of the machine tool, a nozzle attached to the output shaft of said rotary actuator, a pulse motor adapted to drive said rotary actuator, and a control section connected to the numerical control unit of the machine tool. The control section control the pulse motor in accordance with the instruction relating to the cutting tool for changing the angle of the nozzle at a suitable position.

2 Claims, 1 Drawing Figure

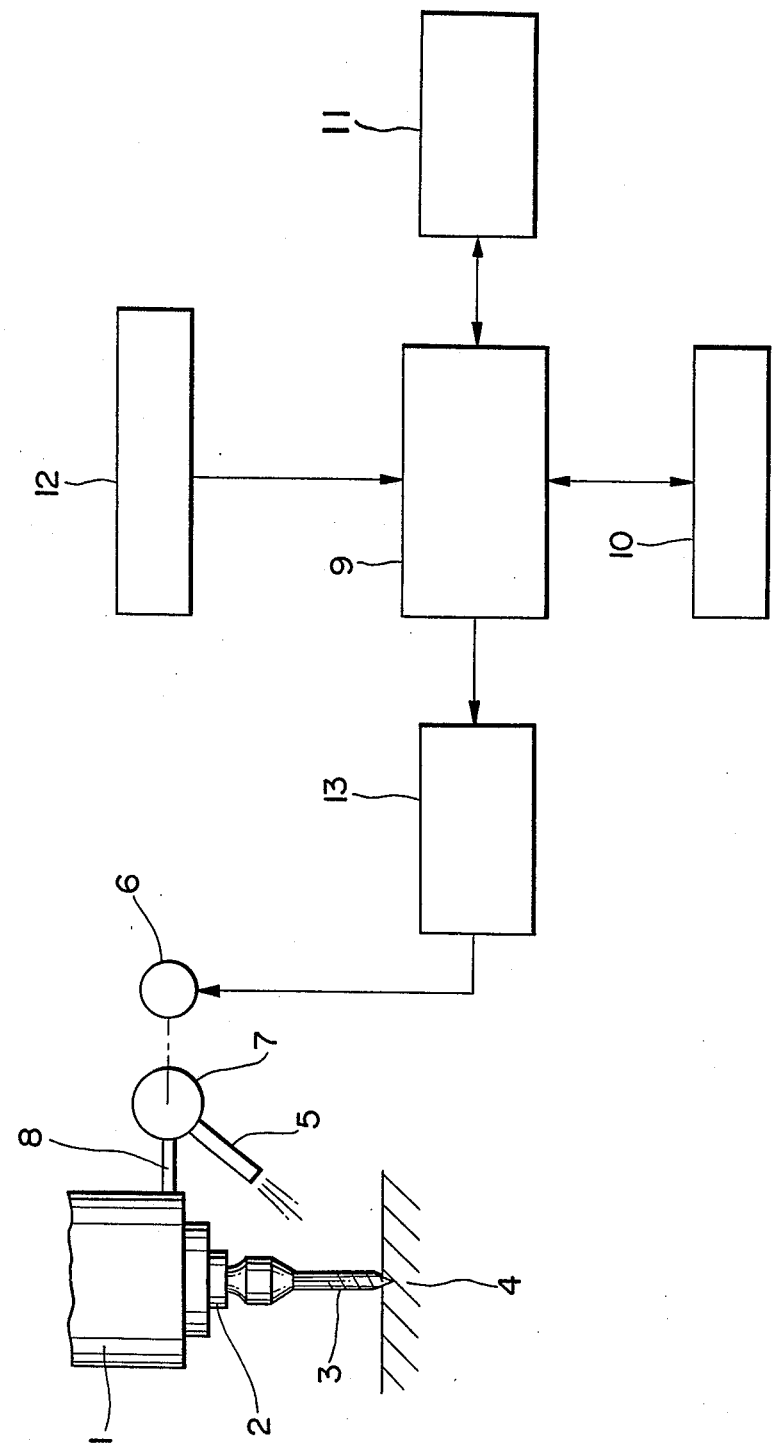

NOZZLE DEVICE FOR CUTTING FLUID FOR MACHINE TOOLS

BACKGROUND OF THE INVENTION

The present invention relates to an jet device for cutting fluid in which the direction of a nozzle for jetting the cutting fluid is so controllable that the cutting fluid is directed to the most optimum position of the cutting tool in a machine tool.

In the machine tools where a plurality of cutting tools of different configuration and sizes are to be automatically changed so as to continuously proceed with machining, it is necessary to supply cutting fluid to the best position for the respective tools. To attain this aim, the jet direction of the cutting fluid jetted must be changed every time when the length and diameters of the cutting tools are to be changed. In the conventional practice, the operators have changed the position of a nozzle when the cutting tools were changed so that the cutting fluid could be jetted to the most optimum position. This means, therefore, that a contradictory aspect has been seen in the fact that still manual operation by the operators would be required for those machine tools which were developed with a view to saving labour and power.

In order to overcome such problems as above referred to, a device adapted to automatically control the direction of the cutting fluid jet has been proposed. According to the devices so far proposed, it is so contemplated that the sizes of the cutting tools such as length and so forth are to be memorized in a control device in advance, such sizes of the machine tools are to be derived from the memory according to the tool numbers of the particular tools instructed at the time of machining, the jet direction of the nozzles is calculated based on the derivered size at the arithmetic unit and the control instruction is fed to the jet device. This proposal, however, could not solve the problems in that instruction on the jet angle through the calculation could not always direct the jet of the cutting fluid to the most optimum position.

SUMMARY OF THE INVENTION

The object of the present invention is to provide a jet device for cutting fluid which solves the problems above mentioned, and is capable of supplying the cutting fluid to the most optimum position with the construction possibly easiest in control and economical in cost.

BRIEF DESCRIPTION OF THE DRAWINGS

The drawing is a schematic drawing illustrating the jet device according to the present invention.

DETAILED DESCRIPTION OF A PREFERRED EMBODIMENT

The details of the present invention will now be explained with reference to a preferred embodiment as shown in the accompanying drawings.

In the drawing, at a suitable position in the machine tool, for example at the head stock 1 is attached a spindle 2 in a normal manner and a cutting tool 3 is secured to said spindle 2. Cutting is made on the work 4 by rotation and vertical movement of the spindle 2.

To the head stock 1 is fixed a supporting post 8 on which a rotary actuator 7 is supported. At the output shaft of said rotary actuator 7 is secured a nozzle 5 for the cutting fluid. When the rotary actuator 7 is activated, the nozzle 5 for the cutting fluid is tilted vertically so that the jet angle of the cutting fluid may be varied.

When the length and diameter of the cutting tool 3 are changed, the best position to jet the cutting fluid while the cutting tool 3 is machining the work is changed and since the relative position between the nozzle 5 for the cutting fluid and the best position to be jetting will be varied, the cutting fluid cannot be jetted to the most optimum position unless the direction of jet of the cutting fluid by the nozzle 5 will be changed. To cope with this problem, the jet angle of the nozzle will be changed by use of a rotary actuator 7. It is possible to establish definitely the jet angle of the cutting fluid to the most optimum position in accordance with the respective cutting tools. It is therefore possible to implement a continuous automatic machining without requiring any manual operation by using a device adapted to automatically change the jet angle of the nozzles every time the tools may be changed so long as the particular jet angles of the nozzles for cutting fluid for each tool are selected and memorized before starting the automatic continuous machining procedure.

Before starting the machining work, the operator, by use of a switch for rotation of the nozzle for cutting fluid provided in the operation panel 11 for the playback operation, will activate the rotary actuator 7 and shift the nozzle for the cutting fluid to the most optimum angular position for jet for the respective tools. Thus selected jet angles for the cutting fluid nozzles will be read into the control section 9, for example a microcomputor as the digital signals indicating the particular jet angle for the cutting fluid nozzles together with the signal indicating the tool number of the particular tool instructed by the numerical unit of a machine tool and stored in the memory as the data for the instructed cutting tool.

If all data for the nozzle for cutting fluid are stored for all the cutting tools to be utilized, when the instruction is given for a particular tool number of a cutting tool by a numerical control unit 12 of the machine tool, a data corresponding to the instructed cutting tool can be read out of the memory 10 at the control section 9 and the read-out pulse signal indicating the particular direction of rotation and necessary rotationary drive will be sent to the pulse motor 6 which serves to drive the rotary actuator 7 through the drive unit 13. Thus, the jet direction of the nozzle for the cutting fluid may be automatically adjusted to the suitable angular position for the particular cutting tool in use every time the cutting tools are changed.

The data for the jet nozzle for cutting fluid initially input by the operator is constantly stored in the memory 10 to provide the jet angle of nozzle suitable for the respective cutting tools until the operator will subsequently change the jet angle of the nozzles for cutting fluid through a manual operation.

In such case as it is desirous to change the jet angle of the nozzle for cutting fluid or to memorize the data for nozzles for cutting fluid for new cutting tools in place of old ones, the operator may transmit a signal to the drive unit 13 through the control section 9 by the operation panel 11 and change the angle of the nozzle by rotating the pulse motor 6 or select a new jet angle whereby the data for the changed jet angle of nozzles or a new tool may be optionally memorized by storing such data in the memory 10 in the same manner as above.

According to the present invention, the angle of the nozzle may be stored by the play-back method and thus cutting fluid may be jetted to the most optimum position through the visual observation by the operator. Further, no complicated arithmetic circuit or calculation method will be required whereby a simple control unit may be used for necessary control. In addition, due to play-back method, it is not necessary to alter the NC program of a machine tool.

The control unit may be made compact and highly reliable by use of a micro computer.

Owing to the play-back method, such an excellent result has been obtained as it is possible to change the angular position of the nozzle during the operation by interruption by the operator.

What is claimed:

1. A machine, comprising a tool support, a cutting tool rotatably mounted and vertically movable on said support, means supporting a workpiece for engagement by said tool, a rotary actuator rotatably supported on said support, a nozzle having a fluid discharge carried by said actuator and rotatable with said actuator to aim the discharge at the engagement of said tool with the workpiece, a drive motor connected to said actuator to rotate said actuator for varying the direction of the discharge relative to said tool, and control means connected to said drive motor to regulate the driving of said drive motor in accordance with a program positioning of the tool relative to the workpiece.

2. A machine according to claim 1, wherein said control means includes a drive control unit connected to said drive motor, a control section connected to said drive unit which is adapted to process signals relating to the particular cutting tools and said nozzle and including a memory for storing data in respect thereto, a readout connected to said control section for stored data from said memory, said control means including an operation panel for playback operation connected to said control section and generating a drive pulse which is transmitted to said drive motor through said control section in accordance with instructions from said operation panel for playback operation so as to move said nozzle so that said nozzle will be at a selected position in respect to the data for the cutting tools relative to said suitable position in said stored memory, said control means also including a readout for indicating the corresponding angular position of said nozzle which will effect driving of said motor to the selected angle of said nozzle for said cutting fluid.

* * * * *